3,449,241
Patented June 10, 1969

3,449,241
SEPARATING ACYCLIC HYDROCARBONS BY
HYDRATE FORMATION
Herbert J. Gebhart, Jr., Ferguson, and Earle C. Makin, Jr., St. Louis, Mo., assignors to Monsanto Company, St. Louis, Mo., a corporation of Delaware
No Drawing. Continuation-in-part of application Ser. No. 606,532, Jan. 3, 1967. This application May 29, 1968, Ser. No. 732,903
Int. Cl. C10g 21/16; C07c 7/10
U.S. Cl. 208—308                10 Claims

ABSTRACT OF THE DISCLOSURE

Mixtures of acyclic hydrocarbons containing from 1 to 6 carbon atoms per molecule are separated by contacting said mixtures with water and a cyclic ether or cyclic ketone hydrate-forming agent capable of causing the formation of a Type II hydrate. By carrying out the contacting at a temperature below the hydrate formation temperature and at a pressure at least equal to the saturation pressure of the system, the hydrocarbon component having the smallest molecular bulk is preferentially encapsulated in the hydrate.

CROSS REFERENCE TO RELATED APPLICATION

This is a continuation-in-part of our copending application Ser. No. 606,532, filed Jan. 3, 1967, now abandoned.

BACKGROUND OF THE INVENTION

The present invention relates to a process for the separation of mixtures of organic compounds. More particularly, the present invention relates to a new and novel process for separating organic mixtures according to structure by formation of solid hydrates.

One of the most fundamental problems involved in the chemical industry today is that of the separation of mixtures of organic compounds. In many instances, this problem may be solved by simple fractional distillation. However, quite often such organic mixtures contain two or more compounds which form azeotropes or whose boiling points are of such close proximity that fractional distillation is impractical. With such mixtures as these, other separations techniques are generally required. While many such possible alternate separations techniques are known to the prior art such as solvent extraction, extractive distillation, selective adduction, selective adsorption, etc., there is a continuing need for additional separatory processes which may be applied to the separation of those organic mixtures not readily susceptible to separation by fractional distillation.

It is an object of the present invention to provide a new process for the separation of organic mixtures. Another object of the present invention is to provide a new process for the separation of hydrocarbons according to molecular structure. An additional object of the present invention is to provide a new process for the separation of straight-chain hydrocarbons from non-straight-chain hydrocarbons. A further object of the present invention is to provide a new process for the separation of hydrocarbons within the $C_1$ to $C_6$ molecular weight range by means of the formation of hydrates. Additional objects become apparent from the following description of the invention herein disclosed.

SUMMARY OF THE INVENTION

The present invention, which fulfills these and other objects is a process comprising contacting an organic mixture containing acyclic hydrocarbons with water and a cyclic ether or cyclic ketone hydrate-forming agent capable of causing the formation of a Type II hydrate at a temperature below the hydrate formation temperature and at a minimum pressure equal to the saturation pressure of the liquid system. A hydrate is thus formed and is then separated from the liquid remaining by decantation, filtration or other means well-known to the art and the hydrate then raised to a temperature above the hydrate formation temperature whereupon the hydrate is decomposed. The hydrocarbons which were selectively encapsulated by the hydrate may then be readily separated from the water and hydrate-forming agent. By means of the process of the present invention, acyclic hydrocarbons which are difficultly separable from one another by prior art methods may be readily separated.

The hydrocarbons that are preferentially encapsulated by the Type II hydrates are those having the smallest molecular bulk. We use the term "molecular bulk" to define the geometric configuration and size of the hydrocarbon molecules that may be separated according to our invention. Two concepts are involved in our meaning of the term "molecular bulk." The first of these is the "major axis" which we define as the longest straight-chain arrangement of carbon atoms in the molecule. The second is the "minor axis" which we define as the longest straight-chain arrangement of carbon atoms in the molecule, exclusive of the major axis, and is a measure of the branching in the molecule. According to our definition, we say that n-pentane has a major axis of 5 carbon atoms, isopentane a major axis of 4 carbon atoms, neopentane a major axis of 3 carbon atoms.

In applying the foregoing concepts, we say that molecular bulk decreases with decreasing length of major axis irrespective of branching as long as the length of the major axis is not exceeded; and that encapsulation of these hydrocarbons by a given hydrate will increase in the order of decreasing molecular bulk.

When mixtures of hydrocarbons having equal major axis lengths are separated according to our invention, the hydrocarbon having the least amount of branching is preferentially encapsulated in the Type II hydrate. Thus, n-butane and isopentane both have major axes of 4 carbon atoms and n-butane will be preferentially encapsulated in the hydrate, while isopentane will be preferentially excluded from the hydrate. This is because n-butane has a smaller molecular bulk, due to the fact that it has no branching.

When mixtures of compounds having equal major axis lengths and branching of two or more carbon atoms per molecule are separated by our invention, then the compound having the shortest minor axis will be preferentially encapsulated because its molecular bulk is smallest. Thus, 2,3-dimethyl butane would be preferentially encapsulated from a mixture of 2,3-dimethyl butane and 2,2-dimethyl butane because the 2,3-dimethyl butane has the shortest minor axis.

DESCRIPTION OF PREFERRED EMBODIMENTS

In order to further describe and particularly to illustrate the present invention, the following examples are presented. These examples are in no manner to be construed as limiting to the present invention.

Example I

One hundred fifty gm. of ice and 45 ml. (40 gm.) of tetrahydrofuran were added to a precooled stainless steel cell which was maintained at 4° C. in a constant temperature bath. The cell was evacuated to 125 mm. Hg and 15 gm. of a mixture consisting of 33.9% by weight neopentane, 31.1% by weight isopentane and 35% by weight n-pentane were added. Nitrogen was then introduced into the cell and the cell pressured with the nitrogen to a pressure of approximately 50 p.s.i.g. The cell temperature was maintained during the addition of the hydrocarbon mixture and the nitrogen pressurization at the 4° C. temperature. A crystalline hydrate rapidly formed and was removed from the cell and separated and filtered cold. The recovered hydrate was warmed to room temperature (72-75° F.) which dissociated the hydrate. The hydrocarbon fraction released from the hydrate was found to be 87.6% by weight neopentane, 7.2% by weight isopentane and 5.2% by weight n-pentane. This represents an increase in neopentane concentration of from 33.9% in the feed to 87.6% in the hydrate fraction or an increase of approximately 158.4%. Along with this, the ratio of isopentane to n-pentane increased from 0.9:1 to 1.4:1.

Example II

Example I was substantially repeated with the exception that 15 ml. of a mixture consisting of 78.1% by weight isobutane and 21.9% by weight n-butane was separated. The hydrocarbon fraction recovered from the decomposed hydrate consisted of 93% by weight isobutane and 7% by weight normal butane.

Example III

Example I was repeated with the exception that a hydrocarbon mixture of isobutene and cis-butene-2 was separated. The mixture contained 43.9% by weight isobutene and 56.1% cis-butene-2. The hydrocarbon fraction recovered from the decomposed hydrate consisted of 67.9% by weight isobutene and 32.1% by weight cis-butene-2.

Example IV

The procedure of Example I was repeated using 15 ml. of a hydrocarbon feed mixture having the composition set forth below. The composition of the hydrocarbon fraction recovered from the decomposed hydrate appears in the column denoted as "Hydrate":

| Component | Feed (Percent by wt.) | Hydrate (Percent by wt.) |
|---|---|---|
| Isobutane | 3.70 | 7.70 |
| n-Butane | 7.07 | 3.75 |
| Butene-1 | 18.97 | 8.31 |
| Isobutene | 55.84 | 74.25 |
| Trans-butene-2 | 11.97 | 4.56 |
| Cis-butene-2 | 2.45 | 1.43 |

Example V

A feed mixture consisting of 67.2% by weight of isobutene, 23.1% by weight n-butenes, 5% by weight n-butane, 4.4% by weight isobutane and 0.3% by weight butadiene is continuously introduced in liquid phase into a cylindrical column at about the midpoint of said column. Furan and water in a weight ratio of approximately 1:5 is continuously introduced into the column near the top thereof. In the column, the furan and water concurrently contact the hydrocarbon mixture. The temperature within the column ranges from approximately +3 to +5° C. at the bottom to +1 to +2° C. at the top of the column. An overhead fraction is continuously taken from the top of the column. This overhead fraction contains the hydrocarbon components not encapsulated by the hydrate. A bottoms fraction is also continuously taken from the top of the column. This bottoms fraction is the hydrate and the hydrocarbons encapsulated therein. The hydrate is passed to a recovery zone wherein the temperature is raised and the hydrate is decomposed. Hydrocarbons in this zone are separated from the furan and water and the furan and water recycled to the column. On analysis, this hydrocarbon fraction is found to contain 5.3% by weight isobutane, 89.2% by weight isobutene, 4.1% by weight n-butenes, 1.3% by weight n-butane and 0.1% by weight butadiene.

Example VII

The procedure of Example I is followed using a feed stream containing 50% by weight ethane and 50% by weight propylene. 1,4-dioxane is added as the hydrate-forming agent. The hydrocarbon fraction recovered from the decomposed hydrate is found to contain 80% by weight ethane and 20% by weight propylene.

Example VIII

The procedure of Example I is followed using a hydrocarbon mixture of 25% by weight methane, 25% by weight ethylene, and 50% by weight n-butenes. Cyclobutanone is utilized as the hydrate-forming agent. The hydrocarbon fraction recovered from the decomposed hydrate is found to contain 78% by weight methane, 18% by weight ethylene and 4% by weight n-butenes.

Example IX

The procedure of Example I is followed using a hydrocarbon mixture of 50% by weight n-hexane and 50% by weight benzene. The hydrocarbon fraction recovered from the hydrate is essentially pure n-hexane.

The process of the present invention is particularly adapted for the separation of straight-chain hydrocarbons from branched-chain hydrocarbons. The hydrates which are formed have specific selectivity for encapsulating the hydrocarbon component that has the shortest major axis from hydrocarbon mixtures. As a result, the hydrocarbon mixtures which may be separated in accordance with the present invention may be either straight-chain hydrocarbons or branched-chain hydrocarbons. The hydrocarbons which may be separated include saturated and unsaturated acyclic hydrocarbons. The hydrocarbons will contain from 1 to 6 carbon atoms per molecule. Among the hydrocarbon mixtures which may be readily separated by the process of the present invention are mixtures containing methane and ethane, ethane and propane, ethylene and propane, ethylene and pentane, ethylene and propylene, propane and isobutane, n-butane and isobutane, n-butenes and isobutene, n-butenes, butadiene and isobutene, n-pentane and neopentane and/or isopentane, n-pentenes and neopentene and/or isoprene, n-hexane and isohexanes and/or neohexane, n-hexenes and isohexenes and/or neohexene, n-hexadiene and isohexadienes and combinations thereof. Our invention can also be used to separate the above-mentioned acyclic hydrocarbons from other organic compounds including cycloaliphatic, aromatic and heterocyclic compounds.

The hydrate-forming agents useful in the process of the present invention are those capable of forming Type II hydrates. Type II hydrates and the means of forming such are well described by R. M. Barrer in chapter 6, particularly pages 313 through 324, of the publication "Non-stoichiometric Compounds" published by Academic Press, 1964. For the purposes of the process of the present invention, the hydrate-forming agents most often are compounds selected from the group consisting of cyclic ethers, and cyclic ketones. Several non-limiting examples of such compounds are tetrahydrofuran, 2,5-dihydrofuran, furan, propylene oxide, cyclopropanone, methylcyclopropanone, 1,3-dioxolan, 1,4-dioxane, 1,3-dioxane, trimethylene oxide, cyclobutanone, and the like. Regardless of the hydrate-forming agent used, it is preferred that the hydrate-forming agent have a molecular length within the range of 5.8 to 7.0 angstroms, more preferably, 5.8 to 66.5 angstroms. The preferred hydrate-forming agents for the practice of the present invention are tetrahydrofuran and furan.

In carrying out the process of the present invention, the hydrocarbon mixture to be separated is contacted with water and the hydrate-forming agent at a temperature below the hydrate formation temperature. The term "hydrate formation temperature" as used herein means the maximum temperature at which a given hydrate can exist. This temperature, of course, will vary depending upon the pressure, the hydrate-forming agent and the hydrocarbon mixture being separated. The temperature at which a hydrate will form with a particular hydrate-forming agent is directly related to the pressure. As pressures are reduced, the hydrate forms at lower temperatures while, conversely, as pressure is increased, the hydrate may be formed at higher temperatures. Generally, the temperatures at which the hydrates are formed in accordance with the process of the present invention will not be lower than about −10° C. and will not be greater than 20° C. For the aforementioned preferred group of the hydrate-forming agents when used to separate hydrocarbon mixtures containing hydrocarbons of 4 to 6 carbon atoms, temperatures within the range of 3° C. to 16° C. preferably are employed.

With respect to the pressures at which the hydrates are formed in accordance with the process of the present invention, such pressures are defined as the minimum pressure equal to the saturation pressure of the liquid system. If lower pressures are employed, liquid-solid extraction cannot be maintained since no hydrate phase exists. The maximum pressure to be employed is generally not critical or limiting as the process proceeds satisfactorily at pressures higher than the mixture saturation pressure. As a practical matter, the pressures will usually be within the range of 0 to 150 p.s.i.g., again varying depending upon the temperature at which it is desired to form the hydrate, the hydrate-forming agent used and the particular hydrocarbons being separated in accordance with the process.

Informing the hydrates of the process of the present invention, usually water is present in a minimum of 2 parts by weight per part by weight of hydrate-forming agent. The maximum weight of water is not particularly critical and can be varied widely. As a practical matter, however, amounts of water above 15 parts of water per part by weight hydrate-forming compound are seldom used. Within the above limitations, the optimum water to hydrate-forming compound weight ratio will vary depending upon the hydrate-forming compound employed, the hydrocarbon to be separated and whether it is desired to operate with a light or heavy slurry of hydrate crystal in water. With the preferred hydrate-forming agents, it is usually prefered to have a water to hydrate-forming compound weight ratio within the range of 2.5:1 to 10:1.

The amount of hydrate-forming agent employed in carrying out the process of the present invention may be varied widely depending upon the efficiency of separation, the hydrocarbon system to be separated and the efficiency of the contact of the components of the system. Normally, it requires a minimum of one mole of hydrate-forming agent to effect separation of two moles of the hydrocarbons having the smallest molecular bulk from admixture with hydrocarbons having a longer major axis. Therefore, a mole ratio of at least 1:2 of hydrate-forming compound to the hydrocarbon having the smallest molecular bulk is most often used through lesser ratios might be used if desired. Seldom will a mole ratio greater than 1:1 of hydrate-forming compound to the hydrocarbon having the smallest molecular bulk be employed.

In carrying out the separation process of the present invention, the water, hydrate-forming compound and the hydrocarbon mixture to be separated may be brought into contact with one another above the hydrate formation temperature, intimately mixed and then the mixture reduced below the hydrate formation temperature. Alternatively, the water, hydrate-forming compound and hydrocarbon mixture may be concurrently introduced into the contact with one another below the hydrate formation temperature thereby causing almost instantaneous formation of the hydrate containing the encapsulated branched-chain hydrocarbons. In another embodiment, the water and hydrate-forming compound may be contacted under conditions to form a hydrate and the hydrocarbon mixture to be separated then brought into contact therewith under the above-described conditions. As a practical matter, it is usually desired to operate the present process in accordance with either of the first two methods above.

What is claimed is:

1. A process for the separation of acyclic hydrocarbons which comprises contacting a mixture of said hydrocarbons with water and a cyclic ether or cyclic ketone hydrate-forming agent capable of causing the formation of a Type II hydrate at a temperature below the hydrate formation temperature of the water and said hydrate-forming agent and the minimum pressure equal to the saturation pressure of the liquid system and thereafter separating the hydrate from the liquid remaining.

2. The process of claim 1 wherein said hydrocarbons contain from 1 to 6 carbon atoms per molecule.

3. The process of claim 1 wherein said hydrate-forming agent is a compound having a molecular length of 5.8 to 7 angstroms.

4. The process of claim 3 wherein said hydrate-forming agent is selected from the group consisting of furan and tetrahydrofuran.

5. The process of claim 4 wherein said mixture contains n-butenes and isobutene.

6. The process of claim 1 wherein the hydrate formation temperature is within the range of 0 to 20° C.

7. The process of claim 1 wherein the water is present in a ratio by weight to the hydrate-forming agent within the range of 2:1 to 15:1.

8. The process of claim 1 wherein the hydrate-forming compound is present in a mole ratio to the hydrocarbon having the smallest molecular bulk in the mixture to be separated of at least 1:2.

9. The process of claim 1 wherein said pressure is in the range of about 0 to 150 p.s.i.g.

10. The process of claim 1 wherein the hydrate formed is separated from the liquid remaining, thereafter raised to a temperature above the hydrate formation temperature to thereby decompose said hydrate and the hydrocarbon fraction recovered therefrom is substantially richer in the hydrocarbon having the smallest molecular bulk than the original mixture.

References Cited

UNITED STATES PATENTS

| 2,399,723 | 5/1946 | Crowther | 260—676 |
| 2,410,583 | 11/1946 | Hutchinson | 260—676 |

HERBERT LEVINE, *Primary Examiner.*

U.S. Cl. X.R.

55—82; 260—676